United States Patent [19]

Van Gaver

[11] 3,728,401

[45] Apr. 17, 1973

[54] ALPHA-HALOGENO-LAUROYL PEROXIDES, SOLUTIONS THEREOF, AND METHODS OF PREPARING THEM

[75] Inventor: Georgette Steinbach Van Gaver, Paris, France

[73] Assignee: Produits Chimiques Pechiney Saint-Gobain, Paris, France

[22] Filed: Dec. 29, 1966

[21] Appl. No.: 605,628

[30] Foreign Application Priority Data

Jan. 17, 1966  France.................................6646153

[52] U.S. Cl..............................................260/610 D
[51] Int. Cl...............................................C07c 73/02
[58] Field of Search...................................260/610 D

[56] References Cited

UNITED STATES PATENTS

| 2,792,423 | 5/1957 | Young et al. | 260/610 |
| 1,718,609 | 6/1959 | Stroddard et al. | 260/610 D |
| 2,559,630 | 7/1951 | Bullitt | 260/610 D |
| 2,775,618 | 12/1956 | Dittman et al. | 260/610 D |

FOREIGN PATENTS OR APPLICATIONS 667,317  7/1963  Canada............................260/610 D

OTHER PUBLICATIONS

Berichte Deutsche Chemische Geselschaft, Vol. 30, 1900, pp. 1043–1047

Primary Examiner—Bernard Helfin
Assistant Examiner—W. B. Lone
Attorney—John L. Seymour and Arthur W. Dew

[57] ABSTRACT

New alpha-halogeno-lauroyl peroxides are described with novel processes of making them and with some reference to their uses. In general, they are prepared by mixing an alpha-halogeno-lauroyl halide diluted in a solvent inert to the constituents of the reaction medium with hydrogen peroxide in the presence of caustic soda under conditions of temperature, pressure, agitation favorable to their reaction.

3 Claims, No Drawings

ALPHA-HALOGENO-LAUROYL PEROXIDES, SOLUTIONS THEREOF, AND METHODS OF PREPARING THEM

This invention relates to alpha-halogeno-lauroyl peroxides and to their preparation. These products have the formula

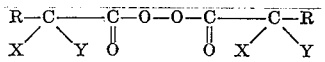

in which R is a saturated aliphatic radical of 10 C atoms which may have from no to several substituents, notably halogens, and in which X and Y are either hydrogen or halogen, at least one of them always being halogen. Halogen may be chlorine, bromine, iodine. As chlorine is efficient and relatively inexpensive, the chlorinated derivatives have been chosen as the best mode to illustrate the invention, but it is to be understood that the other halogens can be substituted for it. Representative of the useful peroxides corresponding to the foregoing definition are : Alpha-chloro-lauroyl peroxide which has the formula:

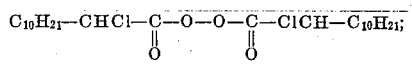

alpha-alpha-dichloro-lauroyl peroxide which has the formula

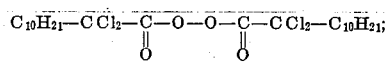

alpha-alpha-beta-trichloro-lauroyl peroxide which has the formula

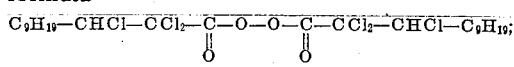

and alpha-beta-beta-trichloro-lauroyl peroxide which has the formula

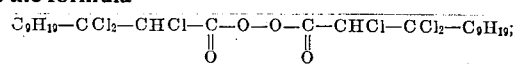

These formulas illustrate the fact that the radical R may have substituents in addition to those which are found on the alpha molecule. It is also to be noted that these halogens may be the same or different.

EXAMPLE 1

For purposes of illustration the following detailed description of the manufacture of alpha-chloro-lauroyl peroxide is given, together with a description of the characteristics of this new compound. The molecular weight of the product of this example was 467 ; it was prepared from the corresponding acid chloride which had a molecular weight of 254. That acid chloride was diluted in a solvent which could be a single solvent or a mixture of them, the solvent being inert to the reaction constituents. The peroxide employed for the reaction was hydrogen peroxide, in the presence of caustic soda. The temperature of reaction was maintained below 0°C and the reaction mass was strongly agitated. The reaction is represented by the following equation :

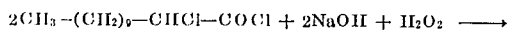
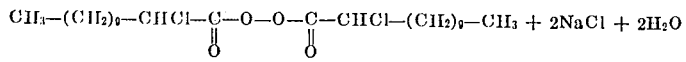

The preparation was carried out in a cylindrical glass tube 7 cm. in diameter, 40 cm.tall, having a discharge valve at the bottom.The tube was jacketed for the circulation of fluid refrigerant ; it was provided with a tulip agitator rotating at 150 r.p.m.,with a thermometer and with a charging funnel.

A solution of 250 g. of water, 9.5 g. of NaOH, and 67.5 g. of NaCl, was poured into the tube and chilled to −10°C. Into this mixture was slowly poured 15 cc. of hydrogen peroxide of 334.5 g./l. concentration, the addition taking 5 minutes, the temperature remaining at −10°C. and agitation continuing. The charging funnel received a chilled mixture of pure n-hexane, 100 g., and 50.4g. of alpha-chloro-lauroyl chloride. As the agitation continued this cold mixture was added to the reactor at a rate which kept the temperature at about −10°C., which took 20 minutes. The agitation was continued for 1 hour while the temperature was held at −10°C., producing a fine, stable suspension. The agitation was substantially reduced and the reaction medium was neutralized with 5 N hydrochloric acid. The neutralization was followed by measurement of pH. About 4 cc. of the acid were used to attain a pH of the order of 6, at which the separation was substantially completed. (When, in a few cases, the separation was delayed, slight excess of hydrochloric acid was added, but that is not desirable because it tends to liberate the fatty acid from the sodium salt which forms with the alpha-chloro-lauroyl peroxide; the fatty acid passes into the organic layer instead of remaining in the aqueous layer as does the sodium salt). The aqueous layer was removed. The organic layer was poured into a receptacle at −10°C. and dried by agitation with anhydrous sodium sulfate powder (about 4g.). It was filtered, in a chamber at the same temperature, into a weighed receptacle which was then maintained at −20° C. The product was a solution in organic solvent of alpha-chloro-lauroyl peroxide. 119.2 g. of an organic solution containing 1.006 percent of active oxygen was recovered, a solution titrating 29.36 percent of peroxide. The total weight of peroxide obtained was 35g. which corresponded to a yield of 75.2 percent. Because of the difficulties of manipulation it is desirable, for most uses, that the product remains in its solution. It can be disintegrated by heat to produce free radicals.

The yield of the peroxide can be increased at the expense of the sodium salt of the fatty acid by controlling the speed of the agitator. Precise details of this control is to some extent dependent upon the shape of the receptacle so that controlling details must be worked out in practice for the particular reaction vessel employed.

EXAMPLE 2

The operation was as in Example 1 except that the n-hexane was replaced by a mixture of 50 g. of trifluorotrichloro ethane and 50 g. of petroleum ether having a boiling point of 35°-65°C. and $d_{20} = 0.644$. The agitator was rotated at 170 r.p.m. for 20 minutes after the addition of the acid chloride and then was reduced to a speed only sufficient to continue the mixing. At discharge, 132 g. of an organic solution containing 0.946 percent of active oxygen was recovered, a solution titrating 27.61 percent of peroxide. The total weight of peroxide obtained was 36.5g. which corresponded to a yield of 78 percent.

EXAMPLE 3

Operating as in Example 2 the aqueous solution was replaced by a mixture of 500 cc. of water, 9.5g. of NaOH and 144g. of NaCl. The reaction medium was subjected to agitation for an hour at 150 r.p.m. at a temperature of −10°C. after the addition of the alpha-chloro-lauroyl chloride. 164 g. of organic solution containing 37.7 g. of alpha-chloro-lauroyl peroxide was obtained, the yield being 84 percent.

EXAMPLE 4

Operating as in Example 1, the n-hexane was replaced by a mixture of 50 g. of petroleum ether and 50 g. of monofluorotrichloro methane. This produced 140 g. of organic peroxide solution containing 1.417 g. of active oxygen (1.012 percent) corresponding to 41.368 g. of alpha-chloro-lauroyl peroxide, a yield of 29.548 percent. The theoretical weight of peroxide being 46.14 g., the yield was 89.6 percent.

The heat of formation of this product in the solvent mixture described in Example 2 at −10°C. was determined. The calorimetric liquid was pure n-butanol. Q was found to be 50 Kcal./mole.

The infrared spectrum of alpha-chloro-lauroyl peroxide in pure n-hexane was determined at a concentration of 30 percent, at −20°C., and at a thickness of 0.1mm. A cell containing the pure n-hexane with a thickness of 0.8mm. was emplaced for reference at room temperature. In the same way we established the IR sepctrum of lauroyl peroxide. The following table compares the principal absorption wave lengths of the two peroxides in microns, between 5 and 10 microns, with their relative intensities expressed as follows: $s$ = strong, $m$ = medium, $f$ = feeble.

| Lauroyl peroxide | Alpha-chloro-lauroyl peroxide |
|---|---|
| 5.52 $a$ | 5.48 $s$ |
| 5.60 $s$ | 5.58 $s$ |
| 7.08 $f$ | 7.00 $m$ |
| 7.42 $f$ | 7.40 $m$ |
| 8.88 $m$ | 8.6 $m$ |
| 9.50 $s$ | 8.9 $m$ |
|  | 9.5 $s$ |

The absorption bands of the peroxy group at 5.52 and 5.60 in the spectrum of lauroyl peroxide were found to be shifted towards the shorter wave lengths by the atom of chlorine in the alpha-chloro-lauroyl peroxide.

The duration of the half life of the peroxide solution was measured in 30 percent hexane at three different temperatures. The curves established by these iodometric means, for the evolution of the solutions as a function of time have shown that the initial solution having about 30 percent of alpha-chlorolauroyl peroxide lost 50 percent of its active oxygen in 5 hours at 20°C, in 35 hours at 0°C., and in 675 hours at −23°C. These temperature have a controlling effect upon the process even though they do not constitute specific limitations.

The new products can be used to generate active oxygen, to generate free radicals, and to catalyze various processes. Among the processes which can be catalyzed by this invention is the polymerization of vinyl chloride, a description of which will be found in certain copending applications.

As many apparently widely different embodiments of the present invention may be made without departing from the spirit and scope thereof, it is to be understood that the invention is not limited to the specific embodiments.

What is claimed is:

1. Alpha-chloro-lauroyl peroxide having a formula from the group of

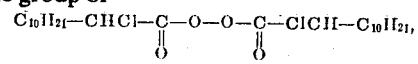

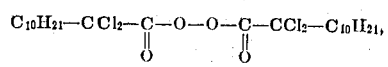

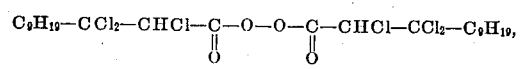

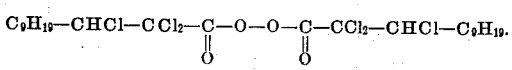

2. The chlorolauroyl peroxide having the formula

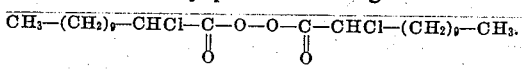

3. The method of preparing an alpha-chloro-lauroyl peroxide having the formula selected from the group of

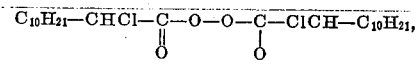

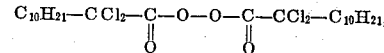

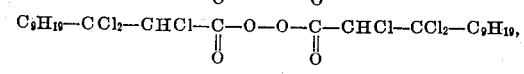

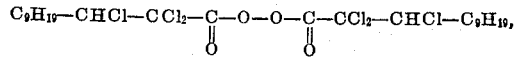

which comprises preparing an aqueous solution of sodium peroxide at a temperature of −10°C., separately preparing a smaller volume of a solution of an alpha chlorolauroyl chloride corresponding to the alpha chloro lauroyl peroxide to be made, in a solvent inert to reaction constituents at a temperature of −10°C., flowing the alpha chloro-lauroyl chloride solution into the larger volume of aqueous peroxide solution at a rate which keeps the temperature of reaction at −10°C. under strong agitation, still maintaining the same strong agitation and the same temperature of −10°C. during at least 20 minutes, separating the organic phase of the reaction medium from the aqueous phase by neutralization with mineral acid under reduced agitation at −10°C. and removing the alpha-chloro-lauroyl peroxide in solution in the solvent.

* * * * *